United States Patent
Tokioka

(10) Patent No.: US 9,771,969 B2
(45) Date of Patent: Sep. 26, 2017

(54) METHOD OF MANUFACTURING TORQUE TRANSMISSION SHAFT AND VEHICLE STEERING APPARATUS

(75) Inventor: Ryoichi Tokioka, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 624 days.

(21) Appl. No.: 14/005,757

(22) PCT Filed: Mar. 16, 2012

(86) PCT No.: PCT/JP2012/056877
§ 371 (c)(1),
(2), (4) Date: Oct. 10, 2013

(87) PCT Pub. No.: WO2012/128213
PCT Pub. Date: Sep. 27, 2012

(65) Prior Publication Data
US 2014/0059832 A1 Mar. 6, 2014

(30) Foreign Application Priority Data
Mar. 18, 2011 (JP) .................................. 2011-061470

(51) Int. Cl.
*F16C 3/03* (2006.01)
*B62D 1/20* (2006.01)
(Continued)

(52) U.S. Cl.
CPC .................. *F16C 3/03* (2013.01); *B62D 1/20* (2013.01); *F16C 3/035* (2013.01); *F16C 33/208* (2013.01);
(Continued)

(58) Field of Classification Search
CPC .......... F16C 3/03; F16C 3/035; F16C 33/208; F16C 2326/24; F16D 3/06; F16D 2250/00;
(Continued)

(56) References Cited

U.S. PATENT DOCUMENTS 2,844,489 A 7/1958 Gemmer
3,367,142 A * 2/1968 Groves ..................... F16D 3/06
464/162

(Continued)

FOREIGN PATENT DOCUMENTS

CN 1223212 A 7/1999
DE 10190280 B4 4/2010
(Continued)

OTHER PUBLICATIONS

May 22, 2012 Search Report issued in International Patent Application No. PCT/JP2012/056877 (with translation).

(Continued)

*Primary Examiner* — Christopher M Koehler
(74) *Attorney, Agent, or Firm* — Oliff PLC

(57) ABSTRACT

In a method of manufacturing an intermediate shaft including: an internal shaft having an external spline; a tubular external shaft having on an inner circumference thereof an internal spline; and a resin coating provided on the external spline, a central axis line of an internal shaft manufacturing intermediate product and a central axis line of an external shaft manufacturing intermediate product are aligned with each other, and the internal shaft manufacturing intermediate product and the external shaft manufacturing intermediate product are held in such a way that the central axis lines thereof can be adjusted, in a heating adaptation step. In this state, the internal shaft manufacturing intermediate product and the external shaft manufacturing intermediate product (Continued)

slide relatively in an axial direction. In the heating adaptation step, a grease is interposed between the internal shaft manufacturing intermediate product and the external shaft manufacturing intermediate product.

9 Claims, 8 Drawing Sheets

(51) Int. Cl.
     *F16D 3/06*     (2006.01)
     *F16C 3/035*   (2006.01)
     *F16C 33/20*    (2006.01)
     *F16D 3/205*   (2006.01)
     *F16D 3/38*     (2006.01)

(52) U.S. Cl.
     CPC ............. F16D 3/06 (2013.01); F16D 3/2052 (2013.01); F16D 3/38 (2013.01); *F16C 2326/24* (2013.01); *F16D 2250/00* (2013.01); *F16D 2250/0046* (2013.01); *F16D 2250/0084* (2013.01); *Y10T 29/4984* (2015.01)

(58) Field of Classification Search
     CPC ..... F16D 2250/0046; F16D 2250/0084; B62D 1/20
     See application file for complete search history.

(56) References Cited

U.S. PATENT DOCUMENTS

| | | | | |
|---|---|---|---|---|
| 4,552,544 A | * | 11/1985 | Beckman | F16C 3/03 403/359.6 |
| 5,720,102 A | * | 2/1998 | McClanahan | F16C 3/03 156/289 |
| 5,903,965 A | * | 5/1999 | Fletcher | B29C 41/14 264/134 |
| 6,089,756 A | | 7/2000 | Ono et al. | |
| 6,149,526 A | | 11/2000 | Boersma et al. | |
| 6,280,339 B1 | | 8/2001 | Yaegashi et al. | |
| 2002/0157494 A1 | * | 10/2002 | Matsumoto | B62D 1/192 74/492 |
| 2003/0129022 A1 | * | 7/2003 | Brissette | F16C 3/03 403/359.1 |
| 2004/0228554 A1 | | 11/2004 | Fujita et al. | |
| 2006/0130309 A1 | * | 6/2006 | Keller | B23B 25/00 29/558 |
| 2010/0132499 A1 | * | 6/2010 | Nakatani | B62D 1/16 74/493 |
| 2011/0030496 A1 | | 2/2011 | Tokioka | |
| 2011/0034256 A1 | * | 2/2011 | Tokioka | B62D 1/185 464/162 |
| 2014/0041194 A1 | | 2/2014 | Kurokawa et al. | |

FOREIGN PATENT DOCUMENTS

| | | |
|---|---|---|
| EP | 2281731 A2 | 2/2011 |
| JP | B 45-5081 | 2/1970 |
| JP | A 63-176824 | 7/1988 |
| JP | A 64-55411 | 3/1989 |
| JP | A 9-105419 | 4/1997 |
| JP | A 10-259827 | 9/1998 |
| JP | 2000240671 A | 9/2000 |
| JP | A 2004-340248 | 12/2004 |
| JP | B2 4045112 | 2/2008 |
| JP | 2009121529 A | 6/2009 |
| JP | A 2009-168194 | 7/2009 |
| JP | 2010095159 A | 4/2010 |
| JP | A 2011-38560 | 2/2011 |
| JP | A 2011-38561 | 2/2011 |
| JP | 2012102868 A | 5/2012 |

OTHER PUBLICATIONS

Jun. 2, 2015 Office Action issued in Chinese Patent Application No. 201280013834.5.

Nov. 20, 2014 Search Report issued in European Patent Application No. 12760748.9.

Apr. 21, 2016 Office Action issued in Japanese Patent Application No. 2015-170717.

* cited by examiner

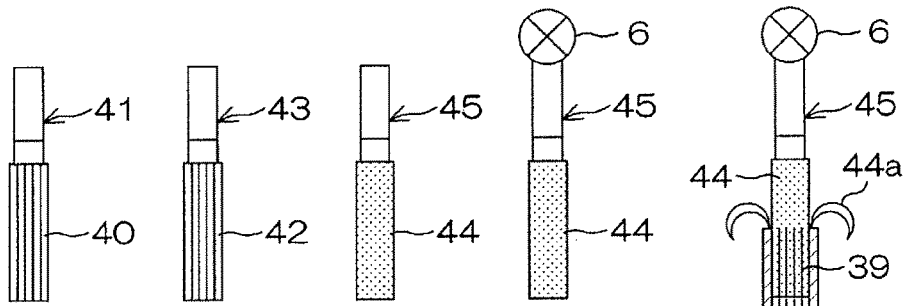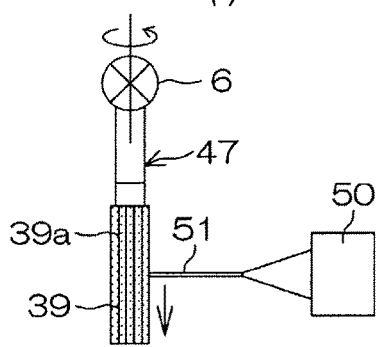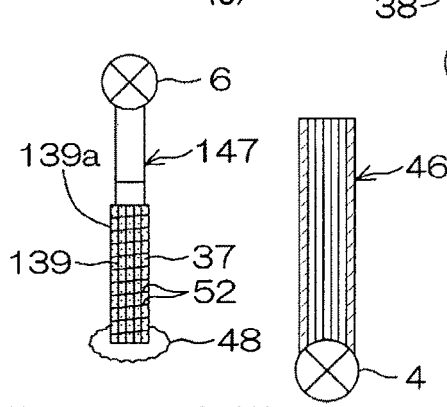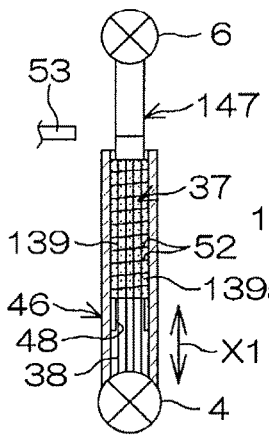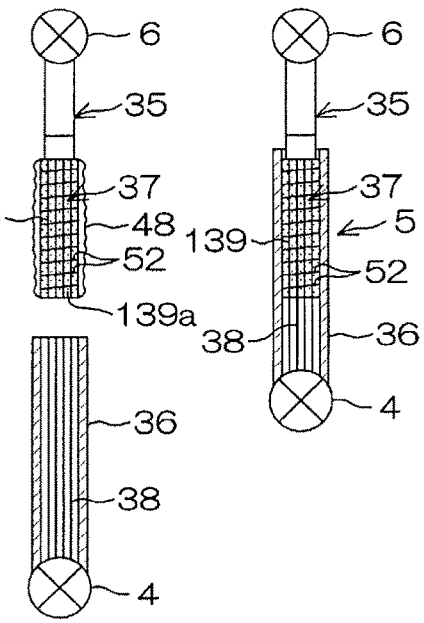

METHOD OF MANUFACTURING TORQUE TRANSMISSION SHAFT AND VEHICLE STEERING APPARATUS

TECHNICAL FIELD

The present invention relates to a method of manufacturing a torque transmission shaft and a vehicle steering apparatus.

BACKGROUND ART

An intermediate shaft or the like of a vehicle steering apparatus is made up of a collapsible torque transmission shaft. In this torque transmission shaft, for example, a male shaft and a female shaft are spline fitted together. There may be a situation in which a resin coating layer is formed on external splines of the male shaft (for example, refer to Patent Literatures 1 to 4). In Patent Literature 4, grooves which are referred to as sink marks are provided in a surface of the resin coating layer, and lubricant (grease) can be held in these grooves.

There may be a situation in which the surface of the resin coating layer is shaped by being rubbed when the torque transmission shaft is manufactured (for example, refer to Patent Literatures 5 to 7).

RELATED ART LITERATURE

Patent Literature

Patent Literature 1: Specification of U.S. Pat. No. 2,844,489
Patent Literature 2: JP-B-45-5081
Patent Literature 3: JP-A-9-105419
Patent Literature 4: JP-A-64-55411
Patent Literature 5: Japanese Patent No. 4045112
Patent Literature 6: JP-A-63-176824
Patent Literature 7: JP-A-2009-168194

SUMMARY OF THE INVENTION

Problem that the Invention is to Solve

The inventor of the invention claimed for patent by this patent application has devised a manufacture of a torque transmission shaft having a resin coating layer by using the following method as a result of having made every effort. Specifically, a molten resin is applied to a surface of a metallic male spline shaft and is then hardened. Next, the male spline shaft is inserted into a female spline shaft, and both the shafts are moved relatively in an axial direction. By doing so, a surface of the resin coating layer can be shaped so as to fit to a surface of the female shaft.

However, when the male shaft manufacturing intermediate product and the female shaft manufacturing intermediate product are caused to slide relatively in the axial direction, in the event that there is produced large friction between the surface of the resin coating layer of the male shaft and the surface of the female shaft, frictional heat and shear stress between the surfaces become large. As a result, the resin is softened, producing abrasion powder. In the event that the abrasion powder is interposed between the shafts which slide relatively in the axial direction, the surface of the resin coating layer is roughened by the abrasion powder. Then, in the event that the surface of the resin coating layer is roughened in that way, when the torque transmission shaft is in use, looseness is produced between the male shaft and the female shaft, calling for production of rattling noise and a reduction in steering feel.

In addition, the relative axial sliding of the male shaft manufacturing intermediate product and the female shaft manufacturing intermediate product is executed by using an actuator such as a hydraulic cylinder or the like. As this occurs, it is ideal that the actuator imparts only a thrust force acting along central axis lines of both the shafts to the shafts. However, a reaction force is applied to the actuator when it is in operation. Because of this, in reality, there may be a situation in which the actuator imparts other forces than the thrust force acting along the central axis lines of both the shafts, for example, a force acting in a radial direction of the female shaft to the female shaft. In the event that such a force is applied to the female shaft, the load applied from the female shaft to the surface of the coating layer becomes uneven, as a result of which there are fears that the surface of the resin coating layer cannot be smoothed evenly.

Additionally, the frictional heat produced when both the male and female shaft manufacturing intermediate products slide constitutes the problem, and therefore, the male and female shaft manufacturing intermediate products cannot be caused to slide at high speeds, which slows the finishing step of finishing the surface of the resin coating layer.

The invention has been made in view of the background described above, and an object thereof is to finish a surface of a resin coating layer which is provided on a sliding portion of a torque transmission shaft more smoothly when the torque transmission shaft is manufactured.

In addition, another object of the invention is to shorten time to be spent finishing the surface of the resin coating layer.

Means for Solving the Problem

With a view to achieving the objects, according to the invention, there is provided a method of manufacturing a torque transmission shaft (5) comprising: an internal shaft (35) having an external spline (37) provided on an outer circumference thereof; a tubular external shaft (36) having on an inner circumference thereof an internal spline (38) which is configured to slidably mesh with the external spline; and a resin coating (139) provided on at least one of the external spline and the internal spline, the method comprising: an adaptation step of adapting a surface (139a) of the resin coating by causing a shaft manufacturing intermediate product (147) of the internal shaft and a shaft manufacturing intermediate product (46) of the external shaft to slide relatively in an axial direction (X1) in such a state that a central axis line (L2) of the shaft manufacturing intermediate product of the internal shaft and a central axis line (L1) of the shaft manufacturing intermediate product of the external shaft are aligned with each other, and the shaft manufacturing intermediate products are held in such a way that the central axis lines thereof can be adjusted, wherein, in the adaptation step, a lubricant (48) is interposed between the shaft manufacturing intermediate products.

According to the invention, in the adaptation step, the shaft manufacturing intermediate products are held in such a way that the central axis lines thereof can be adjusted. Namely, the shaft manufacturing intermediate product of the internal shaft and the shaft manufacturing intermediate product of the external shaft are held in such a way that the shaft manufacturing intermediate products can be displaced in other directions than the axial direction so as to suppress the application of a force which attempts to change the state in which the central axis line of the internal shaft manufacturing intermediate product and the central axis line of the external shaft manufacturing intermediate product are aligned with each other to the shaft manufacturing intermediate products. By adopting this configuration, it is possible to suppress the application of an unintended force other than the thrust force such as a bending force to the shaft manufacturing intermediate products. By performing the adaptation step in this state, all surfaces of portions of the surface of the resin coating which are in touch with the mating member can be evenly brought into sliding contact with (or adapted to) a surface of the mating member. Moreover, the lubricant is interposed between the shaft manufacturing intermediate products. By adopting this configuration, in the adaptation step, it is possible to restrain frictional resistance which is applied to the surface of the resin coating from becoming larger than required. Consequently, it is possible to suppress the softening of the resin coating due to frictional heat or production of a roll of abrasion powder attributed to the shear stress produced in the resin coating, thereby making it possible to suppress the roughening of the resin coating by the abrasion powder. It is possible to finish the surface of the resin coating extremely smoothly by the effect of holding the shaft manufacturing intermediate products in such a way that the central axis lines thereof can be adjusted, coupled with the effect of interposing the lubricant between the shaft manufacturing intermediate products.

On top of that, in the adaptation step, the frictional heat in the resin coating can be lowered, and therefore, the shaft manufacturing intermediate products can be caused to slide relatively at high speeds while suppressing the production of a roll of abrasion of powder. By doing so, the adaptation step can be completed in a short period of time, and therefore, it is possible to manufacture the torque transmission shaft more efficiently. Further, the internal and external shaft manufacturing intermediate products do not have to be positioned accurately to be held prior to the adaptation step. Consequently, time to be spent in holding the shaft manufacturing intermediate products can be shortened, whereby time to be spent in finishing the resin coating can be shortened, thereby making it possible to manufacture the torque transmission shaft more efficiently.

In addition, in this invention, first and second joints (4, 6) are attached to one end portion of the shaft manufacturing intermediate product of the external shaft and one end portion of the shaft manufacturing intermediate product of the internal shaft, respectively. The first and second joints are joints which are configured to permit a change in inclination of the shaft manufacturing intermediate products. There may be a situation in which a load for relative sliding is imparted to the shaft manufacturing intermediate products via the first and second joints.

As this occurs, in causing the shaft manufacturing intermediate products to slide relatively, the shaft manufacturing intermediate products are made to be inclined when a force other than a thrust force which is directed in a direction aligned with the axial direction of the central axis lines of the shaft manufacturing intermediate products (an intended force such as a radial load) is applied to the shaft manufacturing intermediate products. By adopting this configuration, it is possible to suppress the application of the unintended force to the shaft manufacturing intermediate products in an ensured fashion.

Additionally, in the invention, there may be a situation in which the first and second joints are universal joints.

In this case, by adopting this simple configuration in which the two universal joints are used, in the adaptation step, it is possible to suppress the application of the unintended force to the shaft manufacturing intermediate products in an ensured fashion. In manufacturing the torque transmission shaft such as the intermediate shaft of the steering apparatus in which the universal joints are provided individually at the one end portion of the internal shaft and the one end portion of the external shaft, the shaft manufacturing intermediate products can be held in such a way that the central axis lines thereof can be adjusted. By adopting this configuration, in the adaptation step, the number of exclusive parts for holding the shaft manufacturing intermediate produces in such away that the central axis lines thereof can be adjusted can be reduced. In addition, the equipment for holding the shaft manufacturing intermediate products in such a way that the central axis lines thereof can be adjusted can be made small in size.

Additionally, in the invention, there may be a situation in which the adaptation step is completed after temperature (TP) of the shaft manufacturing intermediate products exceeds a predetermined temperature (TP1) and when sliding load (F) of the shaft manufacturing intermediate products lowers below a predetermined load (F1).

In the adaptation step, when the shaft manufacturing intermediate products start to slide relatively, firstly, the temperature of the shaft manufacturing intermediate products is increased by the sliding friction of the shaft manufacturing intermediate products. Additionally, by continuing the relative sliding, the surface of the resin coating is adapted to the surface of the mating member, whereby the sliding resistance of the shaft manufacturing intermediate products is reduced. In addition, the temperature of the shaft manufacturing intermediate products is also reduced in association with the reduction in sliding resistance of the shaft manufacturing intermediate products. In this way, by completing the adaptation step after the temperature of the shaft manufacturing intermediate products exceeds the predetermined temperature and at the timing at which the sliding load of the shaft manufacturing intermediate products lowers below the predetermined load, the adaptation step can be completed at the appropriate timing.

Additionally, in the invention, there may be a situation in which the lubricant comprises a grease or a base oil for the grease.

As this occurs, the sliding resistance of the shaft manufacturing intermediate products can be reduced by using the lubricant necessary when the torque transmission shaft is used. Thereby, in the adaptation step, it is not necessary to prepare separately the lubricant for reducing sliding resistance of the shaft manufacturing intermediate products, and it is possible to reduce the manufacturing cost of the torque transmission shaft.

According to the invention, the circumferential looseness of the torque transmission shaft which transmits torque necessary to steer the vehicle can be reduced, and the collapsing operation of the torque transmission shaft can be performed smoothly. This can realize the vehicle steering apparatus which has superior quietness and steering feel.

In the description of the means for solving the problem made above, although the parenthesized numerals and the like represent reference numerals of corresponding constituent elements in an embodiment which will be described below, there is no intention to limit claims of the invention by those reference numerals.

BRIEF DESCRIPTION OF THE DRAWINGS

FIGS. 4(a) to 4(j) show schematic diagrams showing sequentially manufacturing steps of the intermediate shaft.

BEST MODE FOR CARRYING OUT THE INVENTION

Referring to the accompanying drawings, a preferred embodiment of the invention will be described.

Figure 1:
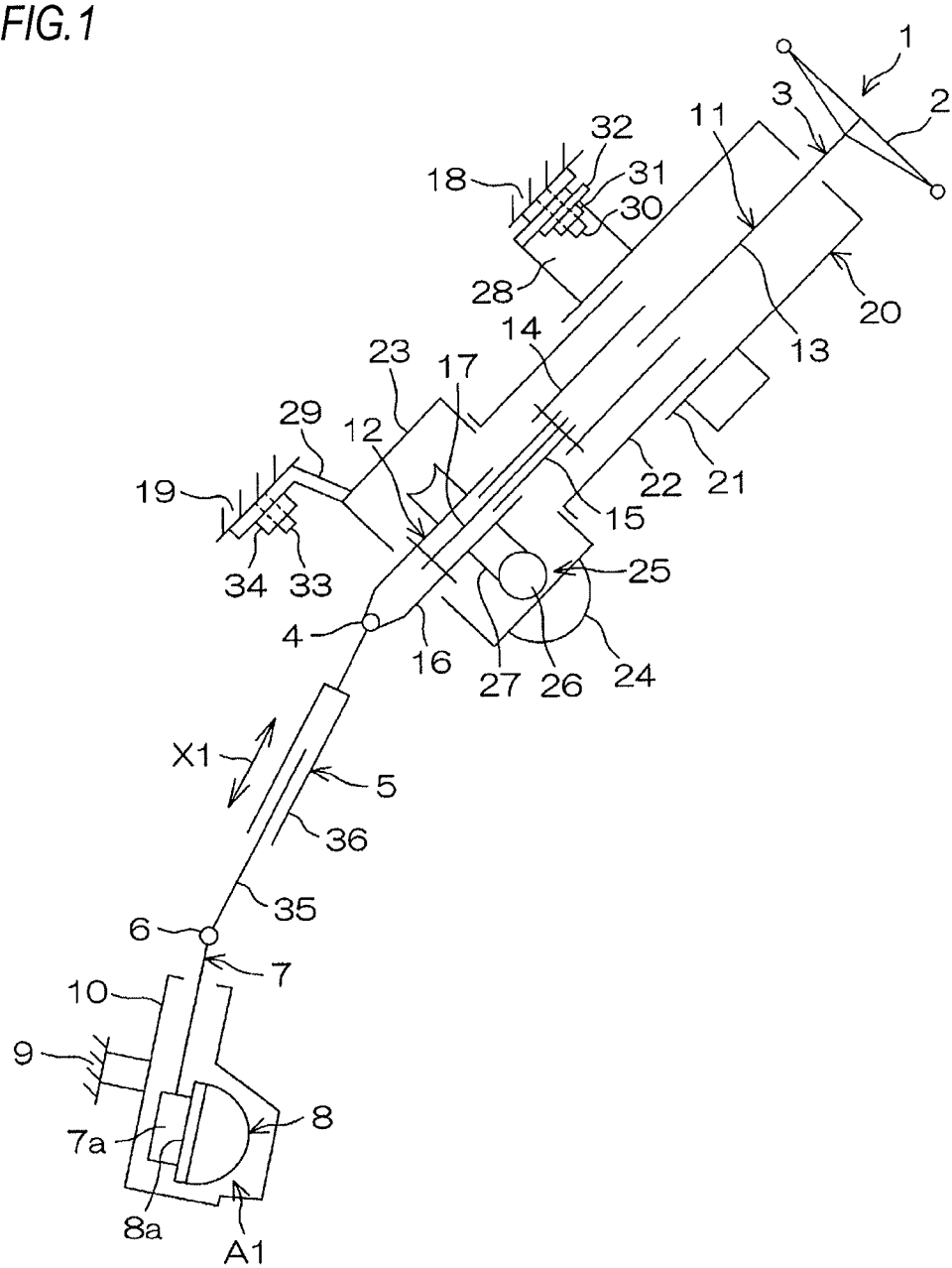
FIG. 1 is an exemplary diagram showing a schematic configuration of a vehicle steering apparatus which has an intermediate shaft as a torque transmission shaft according to an embodiment of the invention.

FIG. 1 is a schematic block diagram of a vehicle steering apparatus having an intermediate shaft to which a torque transmission shaft according to an embodiment of the invention is applied. Referring to FIG. 1, a vehicle steering apparatus 1 includes a steering shaft 3 which is coupled to a steering member 2 such as a steering wheel or the like, an intermediate shaft 5 as a torque transmission shaft (a splined collapsible shaft) which is coupled to the steering shaft 3 via a universal joint 4, a pinion shaft 7 which is coupled to the intermediate shaft 5 via a universal joint 6 and a rack shaft 8 as a road wheel turning shaft which has rack teeth 8a which are in mesh with a pinion 7a which is provided near an end portion of the pinion shaft 7.

A road wheel turning mechanism A1 is made up of a rack and pinion mechanism which includes the pinion shaft 7 and the rack shaft 8. The rack shaft 8 is supported by a housing 10 which is fixed to a body-side member 9 so as to move in an axial direction (a direction which intersects a plane of a sheet of paper on which FIG. 1 is drawn at right angles) which extends along a left-to-right or transverse direction of the vehicle. Although not shown, end portions of the rack shaft 8 are coupled to corresponding steering road wheels via corresponding tie-rods and corresponding knuckle arms.

The steering shaft 3 includes a first steering shaft 11 and a second steering shaft 12 which are coupled together concentrically. The first steering shaft 11 has an upper shaft 13 and a lower shaft 14 which are fitted together through spline connection so as not only to rotate together but also to slide relatively in the axial direction. Either of the upper shaft 13 and the lower shaft 14 makes up an internal shaft, and the other makes up a tubular external shaft.

The second steering shaft 12 has an input shaft 15 which is coupled to the lower shaft 14 so as to rotate together therewith, an output shaft 16 which is coupled to the intermediate shaft 5 via the universal joint 4, and a torsion bar 17 which connects the input shaft 15 and the output shaft 16 together so as to rotate relatively.

The steering shaft 3 is supported rotatably by a steering column 20 via a bearing, not shown, the steering column 20 being fixed to body-side members 18, 19.

The steering column 20 includes a tubular upper jacket 21 and a tubular lower jacket 22 which are fitted together so as to move relatively in an axial direction and a housing 23 which is coupled to an axial lower end of the lower jacket 22. A speed reduction mechanism 25 is accommodated in the housing 23 for decelerating a steering assist electric motor 24 to transmit the power of the decelerated electric motor 24 to the output shaft 16.

The speed reduction mechanism 25 has a drive gear 26 which is coupled to a rotational shaft (not shown) of the electric motor 24 so as to rotate together therewith and a driven gear 27 which is in mesh with the drive gear 26 and which rotates together with the output shaft 16. The drive gear 26 is made up of, for example, a worm shaft, and the driven gear 27 is made up of a worm wheel.

The steering column 20 is fixed to the body-side members 18, 19 via a rear upper bracket 28 and a front lower bracket 29, respectively. The upper bracket 28 is fixed to the body-side member 18 by using a fixing bolt (a stud bolt) 30 which projects downwards from the body-side member 18, a nut 31 which is screwed on to the fixing bolt 30 and a capsule 32 which is removably held to the upper bracket 28.

The lower bracket 29 is fixed to the housing 23 of the steering column 20. In addition, the lower bracket 29 is also fixed to the body-side member 19 by using a fixing bolt (a stud bolt) 33 which projects from the body-side member 19 and a nut 34 which is screwed on to the fixing bolt 33.

Figure 2:
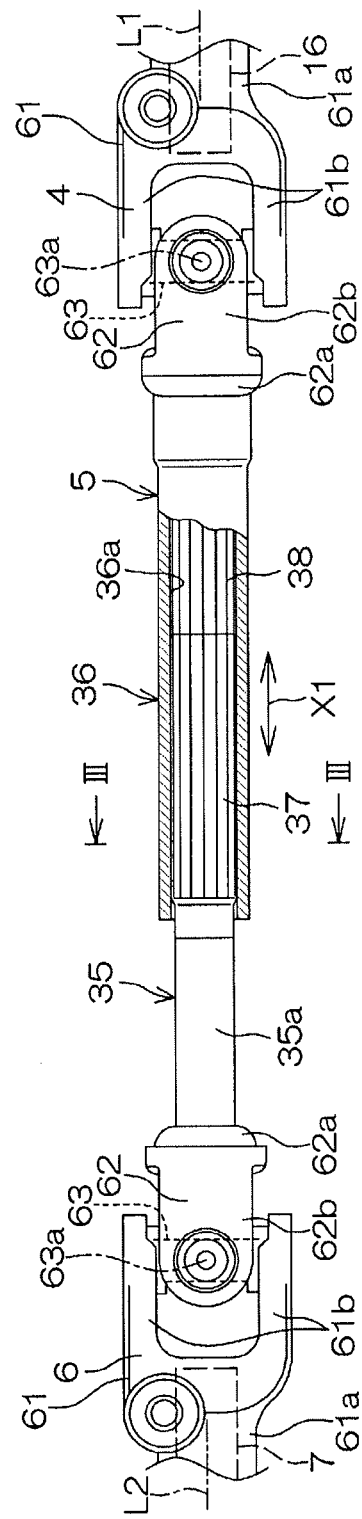
FIG. 2 is a partially cutaway side view of the intermediate shaft.

Referring to FIGS. 1 and 2, the intermediate shaft 5 which is the torque transmission shaft is made up of an internal shaft 35 and a tubular external shaft 36 which are spline fitted together so as not only to slide along an axial direction X1 of the intermediate shaft 5 but also to transmit torque. Either of the internal shaft 35 and the external shaft 36 makes up an upper shaft and the other makes up a lower shaft. In this embodiment, the external shaft 36 is coupled to the universal joint 4 as the upper shaft, while the internal shaft 35 is coupled to the universal joint 6 as the lower shaft.

In this embodiment, while the torque transmission shaft will be described as being applied to the intermediate shaft 5, the torque transmission shaft of the invention may be applied to the first steering shaft 11, and the first steering shaft 11 may be given a telescopic adjusting function and an impact absorbing function. In addition, in this embodiment, while the vehicle steering apparatus 1 will be described as being an electric power steering apparatus, the torque transmission shaft of the invention may be applied to a manually powered vehicle steering apparatus.

Referring to FIG. 2, the universal joint 4 constitutes a first universal joint (a first joint). The universal joint 4 includes a yoke 61 which is provided on the output shaft 16 of the steering shaft 3, a yoke 62 which is provided at one end portion of the external shaft 36 and a cruciform shaft 63 which is disposed between the yokes 61, 62 so as to couple them together.

The yoke 61 has a Y-shape and has a tubular base portion 61a and a pair of limbs 61b, 61b which extend from the base portion 61a. A fitting hole is formed in the base portion 61a and the output shaft 16 is fittingly fixed in this fitting hole. The pair of limbs 61b, 61b extend parallel to each other.

The yoke 62 has the same shape as that of the yoke 61. Specifically, the yoke 62 is formed into a U-shape and has a base portion 62a and a pair of limbs 62b, 62b (one limb 62b of which is not shown in FIG. 2) extending from the base portion 62a. One end portion of the external shaft 36 is fixed to the base portion 62a. The pair of limbs 62b, 62b extend parallel to each other.

The cruciform shaft 63 is disposed between the pair of limbs 61b, 61b and the pair of limbs 62b, 62b. Four distal end portions of the cruciform shaft 63 are coupled to the limbs 61b, 61b, 62b, 62b via bearings (not shown), respectively. This configuration enables the yoke 61 and the yoke 62 to rotate relatively about a center 63a of the cruciform shaft 63. The center 63a of the cruciform shaft 63 is disposed on a central axis line L1 of the external shaft 36.

The universal joint 6 constitutes a second universal joint (a second joint). The universal joint 6 includes a yoke 61 which is provided at one end portion of the pinion shaft 7, a yoke 62 which is provided at one end portion of the internal shaft 35 and a cruciform shaft 63 which is disposed between the yokes 61, 62 so as to couple them together. A center 63a of the cruciform shaft 63 of the universal joint 6 is disposed on a central axis line L1 of the internal shaft 35.

The configurations of the universal joints 4, 6 are the same. Consequently, in the following description, like reference numerals to those of the corresponding constituent elements of the universal joint 4 will be given to constituent elements of the universal joint 6, so that a detailed description thereof will be omitted.

Figure 3:
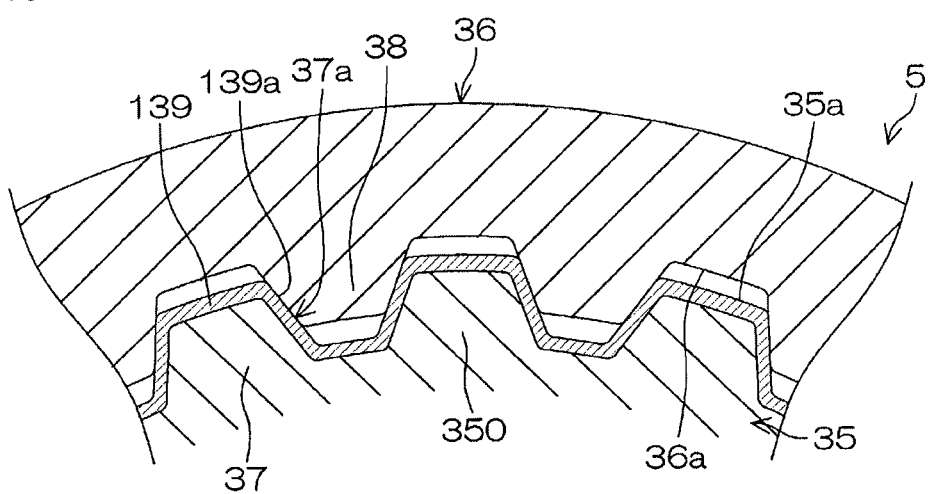
FIG. 3 is a sectional view taken along the line III-III in FIG. 2.

FIG. 3 is a sectional view taken along the line in FIG. 3. Referring to FIGS. 2 and 3, external splines 37 which are provided on an outer circumference 35a of the internal shaft 35 and internal splines 38 which are provided on an inner circumference 36a of the external shaft 36 are fitted in and on each other. In this embodiment, as shown in FIG. 3, a resin coating 139 having a surface 139a to which a heating adaptation process (refer to FIG. 4(h)) to the external shaft 36 is applied is formed on at least spline surfaces 37a of the external splines 37. Specifically, at least the spline surfaces 37a of the external splines 37 are formed by at least part of the resin coating 139 which is coated around a circumference of a metal core 350 of the internal shaft 35.

A manufacturing process of the intermediate shaft 5 will be described based on FIGS. 4(a) to 4(j) which show schematically steps involved in the manufacturing process.

Firstly, in a forging step shown in FIG. 4(a), a raw material is forged to obtain an internal shaft manufacturing intermediate product 41 on which external splines 40 are formed.

Following this, in a pretreatment step shown in FIG. 4(b), a pretreatment for coating is applied to at least spline surfaces of the external splines 40 of the internal shaft manufacturing intermediate product 41 obtained in the forging step shown in FIG. 4(a). Specifically, a substrate forming treatment such as shot blasting, primer coating or the like, for example, is applied to make the spline surfaces of the external splines 40 smooth as a pretreatment for forming a resin layer 44 in a coating step shown in FIG. 4(c). By applying the pretreatment in this way, an internal shaft manufacturing intermediate product 43 (corresponding to the metal core 350 of the internal shaft 35) having external splines 42 to spline surfaces of which the pretreatment is applied is obtained as shown in FIG. 4(b).

Following this, in the coating step shown in FIG. 4(c), a resin layer 44 is formed on at least the spline surfaces of the external splines 42 of the internal shaft manufacturing intermediate product 43 shown in FIG. 4(b), whereby an internal shaft manufacturing intermediate product 45 on which the resin layer 44 is formed is obtained as shown in FIG. 4(c). Specifically, after having been heated, the pretreated internal shaft manufacturing intermediate product 43 is submerged in a resin powder flowing submerging tank where resin power is kept flowing and is held to stay therein for a predetermined period of time. By being so held, the resin powder adhering to the internal shaft manufacturing intermediate product 43 is melted by heat, whereby a resin layer 44 is formed. An outer circumferential cross section of the resin layer 44 has a circular or substantially circular shape. Thermoplastic resin such as polyamide, polyacetal or the like can be used as a resin from which the resin layer 44 is formed. The resin layer 44 may be formed through injection molding.

Next, in a joint joining step shown in FIG. 4(d), a universal joint 6 is coupled to an end portion of the internal shaft manufacturing intermediate product 45.

Next, in a broaching step shown in FIG. 4(e), an external shaft manufacturing intermediate product 46 is prepared. An external shaft manufacturing intermediate product 46 is formed by forging a raw material into a tubular shape, and internal splines 38 are formed on an inner circumference thereof. A universal joint 4 is attached to one end portion of the external shaft manufacturing intermediate product 46. The internal shaft manufacturing intermediate product 45 on which the resin layer 44 is formed is inserted into an interior of the external shaft manufacturing intermediate product 46, whereby broaching is performed. By performing the broaching in this way, an internal shaft manufacturing intermediate product 47 is obtained which has a resin coating 39 formed by spline surfaces of the internal splines 38 of the external shaft manufacturing intermediate product 46 as shown in FIG. 4(f).

In the broaching step, in performing the broaching, a residual portion 44a of the resin layer 44 is cut to be discharged to the outside of the external shaft manufacturing intermediate product 46 as a mating shaft in the form of shavings as pared from a plane as shown in FIG. 4(e).

Following this, in a groove forming step shown in FIG. 4(f), laser 51 (for example, YVO4 laser or $CO_2$ laser) is shone on to a surface 39a of the resin coating 39 from a laser shining unit 50 in a direction which intersects the axial direction X1. Part of the resin is thermally decomposed and removed by shining the laser in this way. By doing so, an internal shaft manufacturing intermediate product 147 is obtained which has a resin coating 139 on which a spiral groove 52 is formed as shown in FIG. 4(g).

The groove 52 is formed at a predetermined depth from a surface 139a of the resin coating 139. The groove 52 extends so as to cross the external splines 37 of the internal shaft manufacturing intermediate product 147.

It is noted that in place of the machining using the laser 51, the groove 52 may be formed by using a water jet or a fine groove machining employing compressed air.

Referring to FIG. 4(g), a grease 48, which acts as a lubricant, is applied to the internal shaft manufacturing intermediate product 147 on which the groove 52 is formed. The grease 48 is the same as grease which is applied to an intermediate shaft 5 when it is shipped from a factory. The grease 48 is applied to, for example, a distal end of the internal shaft manufacturing intermediate product 147. It is noted that only base oil containing the same constituents as those of base oil for the grease 48 may be applied to an outer circumferential surface of the internal shaft manufacturing intermediate product 147.

Next, in a heating adaptation step shown in FIG. 4(h), the internal shaft manufacturing intermediate product 147 is inserted into the interior of the external shaft manufacturing intermediate product 46 as the mating shaft. As this occurs, the two intermediate products are fitted together through an interference fit with an interference between the external shaft manufacturing intermediate product 46 and the resin coating 139 of the internal shaft manufacturing intermediate product 147 set to something like several tens of μm. Then, the internal shaft manufacturing intermediate product 147 is forced to slide relative to the external shaft manufacturing intermediate product 46 via the grease 48 in the axial direction X1. By doing so, an internal shaft 35 which is coated with the resin coating 139 having the surface 139a which fits to the spline surfaces of the internal splines 38 of the external shaft manufacturing intermediate product 46 and an external shaft 36 are completed.

In the heating adaptation step, frictional heat produced by the forced sliding of the shaft manufacturing intermediate products 46, 147 is used. By doing so, a surface layer portion of the resin coating 139 which is in contact with the external shaft manufacturing intermediate product 46 is heated to a temperature equal to or higher than a fusing point of the resin of the resin coating 139 so as to be fused. The surface layer portion of the resin coating 139 is adapted to the internal splines 38 of the external shaft manufacturing intermediate product 46 while promoting the softening of the resin in that heating state. Thereafter, the resin coating 139 is cooled by air jetted from a nozzle 53. By doing so, the surface 139a of the resin coating 139 can be fitted to the spline surfaces of the internal splines 38 of the external shaft 36 at a certain surface roughness level (a surface roughness level of the order of several tens of μm), whereby the internal shaft 35 is completed.

Next, in a grease application step shown in FIG. 4(i), the grease 48 is applied to the surface of the resin coating 139 of the internal shaft 35. The internal shaft 35 to which the grease 48 is applied is built into the external shaft 36, whereby an intermediate shaft 5 as a splined collapsible shaft is completed as shown in FIG. 4(j).

In the manufacturing steps of the intermediate shaft 5 described heretofore, the heating adaptation step will be described in a greater detail.

Figure 5:
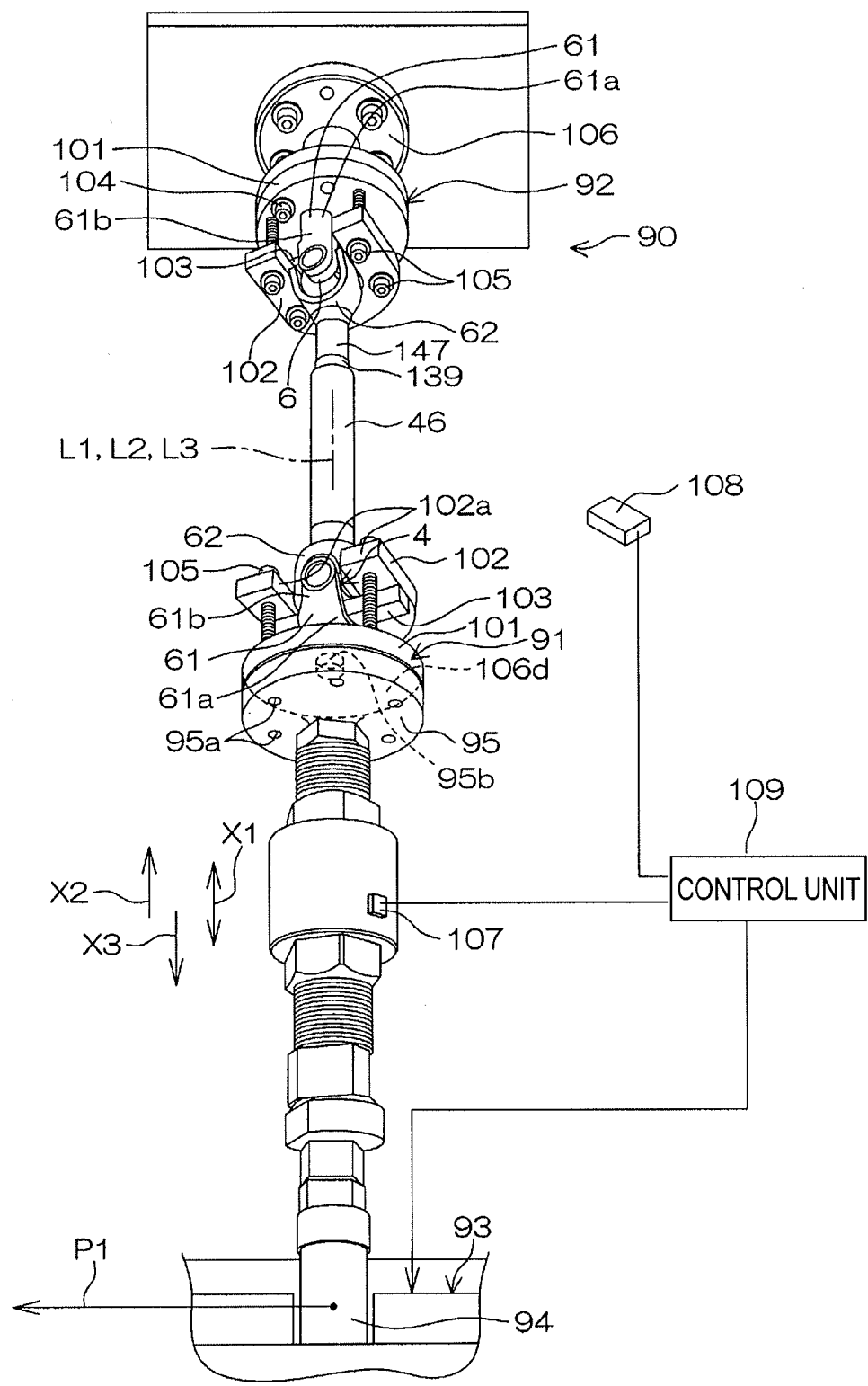
FIG. 5 is a perspective view of a main part of a sliding apparatus as a manufacturing apparatus for performing a heating adaptation step.

FIG. 5 is a perspective view showing a main part of a sliding apparatus 90 as a manufacturing apparatus for performing the heating adaptation step.

The sliding apparatus 90 is designed to hold the external shaft manufacturing intermediate product 46 and the internal shaft manufacturing intermediate product 147 in such a way as to adjust central axis lines thereof while holding the shaft manufacturing intermediate products 46, 147 so that the central axis line L1 of the external shaft manufacturing intermediate product 46 and the central axis line L2 of the internal shaft manufacturing intermediate product 147 are aligned with each other. In addition, the sliding apparatus 90 is also designed to thermally adapt (finish) the surface of the resin coating 139 by causing the shaft manufacturing intermediate products 46, 147 to slide relatively in the axial direction X1.

The sliding apparatus 90 includes a drive mechanism 93 and a first holding mechanism 91 and a second holding mechanism 92 which act as a pair of holding mechanisms.

The drive mechanism 93 is provided to cause the shaft manufacturing intermediate products 46, 147 to slide relatively in the axial direction X1 via the first holding mechanism 91. The drive mechanism 93 is made up of a hydraulic cylinder as an actuator. The hydraulic cylinder includes a rod 94. The rod 94 is made to reciprocate rectilinearly in a direction (the axial direction X) in which the first and second holding mechanisms 91, 92 face each other.

The sliding apparatus 90 is disposed vertically, and a direction in which the rod 94 is displaced coincides with a vertical direction. By disposing the sliding apparatus 90 in that way, it is possible to restrain a bending force caused by their own weights of the shaft manufacturing intermediate products 46, 147 which are held by the sliding apparatus 90 from being applied between the shaft manufacturing intermediate products 46, 147. It is noted that the sliding apparatus 90 may be disposed horizontally so that the rod 94 is displaced horizontally.

A circular disk-shaped coupling plate 95 is fixed to a distal end of the rod 94. A plurality of screw holes 95a are formed in the coupling plate 95.

The first and second holding mechanisms 91, 92 are provided to hold the shaft manufacturing intermediate products 46, 147 which are fitted in and on each other.

The first holding mechanism 91 is connected to the coupling plate 95 and is allowed to reciprocate rectilinearly together with the rod 94. The first holding mechanism 91 is made to hold the universal joint 4 which is provided on the external shaft manufacturing intermediate product 46.

Figure 6A:
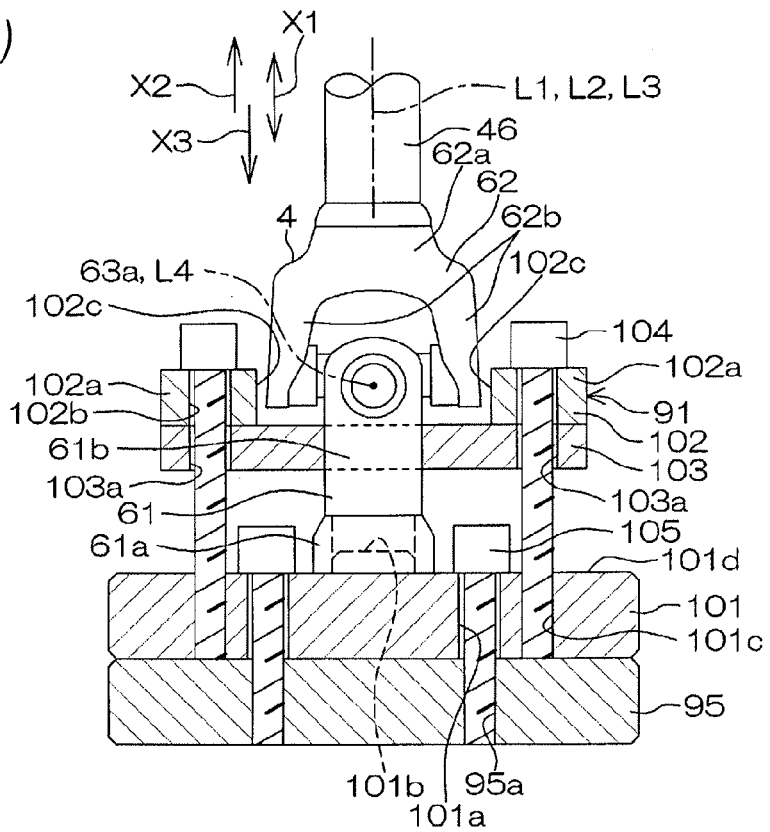
FIG. 6(A) shows a side view of a first holding mechanism which shows a peripheral configuration thereof and FIG. 6(B) shows an exploded perspective view showing part of the first holding mechanism.
Figure 6B:
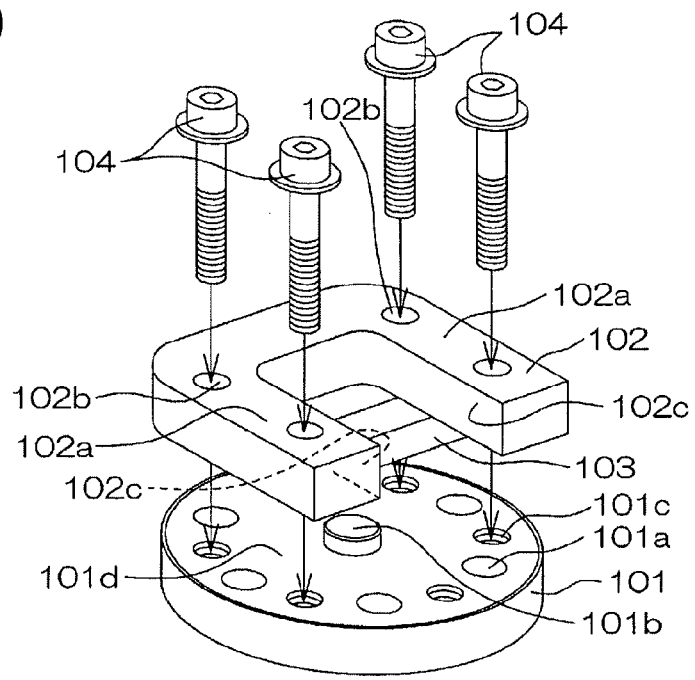

FIG. 6(A) shows a side view showing a peripheral configuration of the first holding mechanism 91, and FIG. 6(B) shows an exploded perspective view showing part of the first holding mechanism 91. As shown in FIGS. 6(A) and 6(B), the first holding mechanism 91 includes a first plate 101, a second plate 102, a third plate 103, and fixing screws 104.

The first plate 101 has a circular disk-like shape. Screw insertion holes 101a are formed in the first plate 101. The first plate 101 is fixed to the coupling plate 95 with fixing screws 105 which pass through these screw insertion holes 101a to be screwed into screw holes 95a.

In addition to the screw insertion holes 101a, a projecting portion 101b and screw holes 101c are also formed in the first plate 101. The projecting portion 101b is formed at a center of an upper surface 101d of the first plate 101 and projects upwardly therefrom. This projecting portion 101b fits in a fitting hole formed in the yoke 61 of the universal joint 4. By doing so, the yoke 61 can be positioned so that the yoke 61 (a center 63a of the universal joint 4) passes through a central axis line L3 of the rod 94. The upper surface 101d of the first plate 101 is in surface contact with one end face of the base portion 61a of the yoke 61.

The plurality of screw holes 101c are provided in an outer circumferential portion of the first plate 101 and are disposed circumferentially at equal intervals in the outer circumferential portion. The screw insertion holes 101a and the screw holes 101c are disposed alternately in the circumferential direction of the first plate 101.

The second plate 102 has a U-shape and includes a pair of oppositely facing portions 102a, 102a. The oppositely facing portions 102a, 102a extend parallel to each other. A plurality of (for example, four) screw insertion holes 102b are formed in the oppositely facing portions 102a, 102a of the second plate 102. The oppositely facing portions 102a, 102a are disposed so as to hold the limbs 62b, 62b of the yoke 62 of the universal joint 4. Inner side surface 102c, 102c of the oppositely facing portions 102a, 102a lie adjacent to outer side surfaces of the limbs 62b, 62b and are able to be brought into contact with the limbs 62b, 62b. By adopting this configuration, it is possible to restrict the yoke 62 from oscillating excessively relative to the yoke 61 (an excessive oscillation of the yoke 62 about a straight line L4 which passes between the pair of limbs 61b, 61b).

The third plate 103 is provided to press against the base portion 61a of the yoke 61. The third plate 103 is formed into a rod-like shape. The third plate 103 has a substantially rectangular cross section. An intermediate portion of the third plate 103 is in contact with the base portion 61a of the yoke 61, and the yoke 61 is held in the axial direction X1 by the third plate 103 and the first plate 101. Longitudinal end portions of the third plate 103 are pressed downwards by the oppositely facing portions 102a, 102a of the second plate 102. In addition, screw insertion holes 103a, 103a are formed in both the end portions of the third plate 103.

The plurality of fixing screws 104 are provided so as to pass through the respective screw insertion holes 102a, 103a of the second plate 102 and the third plate 103 to thereby be screwed into the screw holes 101c in the first plate 101. By doing so, the second plate 102 and the third plate 103 are removably fixed to the first plate 101.

Referring to FIG. 5, the second holding mechanism 92 is fixed to a fixing member 106 which is provided on the sliding apparatus 90. The second holding mechanism 92 is designed to hold the universal joint 6 provided on the internal shaft manufacturing intermediate product 147. The second holding mechanism 92 has the same configuration as that of the first holding mechanism 91. Consequently, like reference numerals to those given to the corresponding elements of the first holding mechanism 91 will be given to constituent elements of the second holding mechanism 92, so that a detailed description thereof will be omitted here. The limbs 61b of the yoke 61 of the universal joint 6 are held by a first plate 101 and a third plate 103 of the second holding mechanism 92 therebetween.

By adopting the configuration described above, the universal joints 4, 6 permit the shaft manufacturing intermediate products 46, 147 which are held by the sliding apparatus 90 to be displaced in an inclined fashion. In addition, the sliding apparatus 90 holds the shaft manufacturing intermediate products 46, 147 in such a way as to adjust the central axis lines thereof via the universal joints 4, 6 and imparts a thrust force to the shaft manufacturing intermediate products 46, 147 with which both the intermediate products are caused to slide relative to each other via the universal joints 4, 6.

In addition, a load cell 107 is provided in the sliding apparatus 90 as a load detector for detecting a sliding load resulting when the shaft manufacturing intermediate products 46, 147 are sliding in the axial direction X1. The load cell 107 is attached, for example, to the rod 94.

Additionally, a temperature sensor 108 is provided in the sliding apparatus 90 for detecting the temperature of the resin coating 139 as the temperature of the shaft manufacturing intermediate products 46, 147. The temperature sensor 108 is, for example, a temperature sensor of non-contact type.

A load detection signal of the load cell 107 and a temperature detection signal of the temperature sensor 108 are inputted into a control unit 109. The control unit 109 controls the drive mechanism 93 based on the detection signals inputted thereinto.

Next, the operation of the sliding apparatus 90 in the heating adaptation step will be described.

In the heating adaptation step, the control unit 109 drives the drive mechanism 93 so as to cause the shaft manufacturing intermediate products 46, 147 to slide relatively in the axial direction X1 to thereby impart frictional heat to the resin coating 139. In the operation of forcing the internal shaft manufacturing intermediate product 147 into the external shaft manufacturing intermediate product 46, the rod 94 of the drive mechanism 93 is displaced in one direction X2 (upwards) of the axial direction X1. By doing so, the first plate 101 of the first holding mechanism 91, the universal joint 4 and the external shaft manufacturing intermediate product 46 are displaced together with the rod 94 in the direction X2 of the axial direction X1. As this occurs, the first plate 101 of the first holding mechanism 91 imparts an upward force to the yoke 61 of the universal joint 4, whereby the universal joint 4 is displaced upwards. On the other hand, the universal joint 6 is received by the first plate 101 of the second holding mechanism 92. By doing so, the displacement of the internal shaft manufacturing intermediate product 147 in the direction X2 of the axial direction X1 is restricted.

In addition, in the operation of pulling the internal shaft manufacturing intermediate product 147 relative to the external shaft manufacturing intermediate product 46, the rod 94 of the drive mechanism 93 is displaced in the other direction X3 (downwards) of the axial direction X1. As this occurs, the third plate 103 of the first holding mechanism 91 presses the base portion 61a of the yoke 61 of the universal joint 4 in the other direction X3 of the axial direction X1. By doing so, the external shaft manufacturing intermediate product 46 is displaced together with the rod in the other direction X3 of the axial direction X1. On the other hand, as this occurs, the base portion 61a of the universal joint 6 is received by the third plate 103 of the second holding mechanism 92, whereby the displacement of the internal shaft manufacturing intermediate product 147 in the other direction X3 of the axial direction X1 is restricted.

By performing the operations described above, the shaft manufacturing intermediate products 46, 147 are extended and retracted repeatedly. Then, as has been described before, frictional heat is produced by the forced sliding of the external and internal shaft manufacturing intermediate products 46, 147. By the frictional heat so produced, the surface layer portion of the resin coating 139 is heated to the temperature equal to or higher than the fusing point of the resin, whereby the resin in the surface layer portion is fused. While promoting the softening of the resin in this heating state, the resin coating 139 is adapted to the internal splines 38 of the external shaft manufacturing intermediate product 46.

Figure 7A:
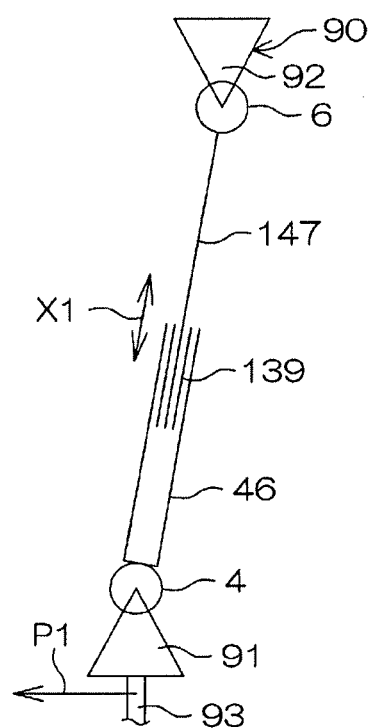
FIG. 7(A) shows an exemplary diagram illustrating the heating adaptation step carried out on shaft manufacturing intermediate products by the sliding apparatus of the invention and FIG. 7(B) shows an exemplary diagram illustrating a heating adaptation step carried out on shaft manufacturing intermediate products by a sliding apparatus of a comparison example.

In performing this heating adaptation step, there may be a situation in which an unintended force (for example, a radial force P1) which is a force acting in a different direction from the axial direction X1 of the shaft manufacturing intermediate products 46, 147 which stay stationary is applied to the rod 94 in reality. When the force P1 is produced, as shown in an exemplary diagram in FIG. 7(A), the shaft manufacturing intermediate products 46, 147 to which the universal joints 4, 6 are attached are inclined from the stationary state resulting before they are caused to start sliding by the drive mechanism 93. As a result, it is possible to normally suppress the application of a force (an unintended force) other than the thrust force acting along the axial direction X1 to between the shaft manufacturing intermediate products 46, 147. This can suppress the application of a local force to the resin coating 139.

Figure 7B:
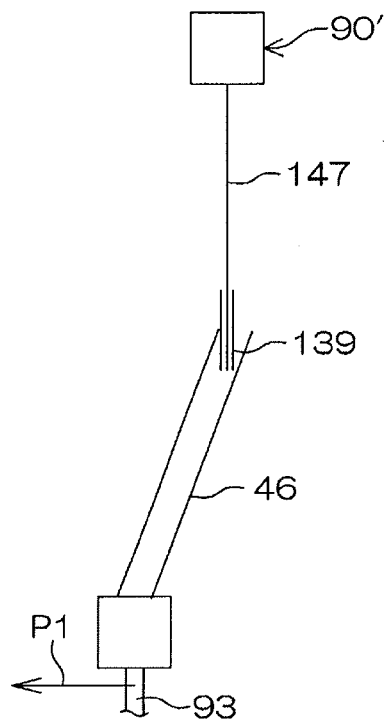

For example, as shown in FIG. 7(B), a sliding apparatus 90' is considered which causes the shaft manufacturing intermediate products 46, 147 to slide while directly holding the shaft manufacturing intermediate products 46, 147 without involving the universal joints 4, 6. In this sliding apparatus 90', there may be a situation in which an unintended force as a force other than the thrust force acting along the axial direction X1 is applied to between the shaft manufacturing intermediate products 46, 147 by a reaction force produced when the sliding apparatus 90' is driven. As this occurs, a bending force is applied to between the shaft manufacturing intermediate products 46, 147, whereby a large local force is applied to part of the resin coating 139, this making it difficult to make the resin coating 139 smooth.

Figure 8:
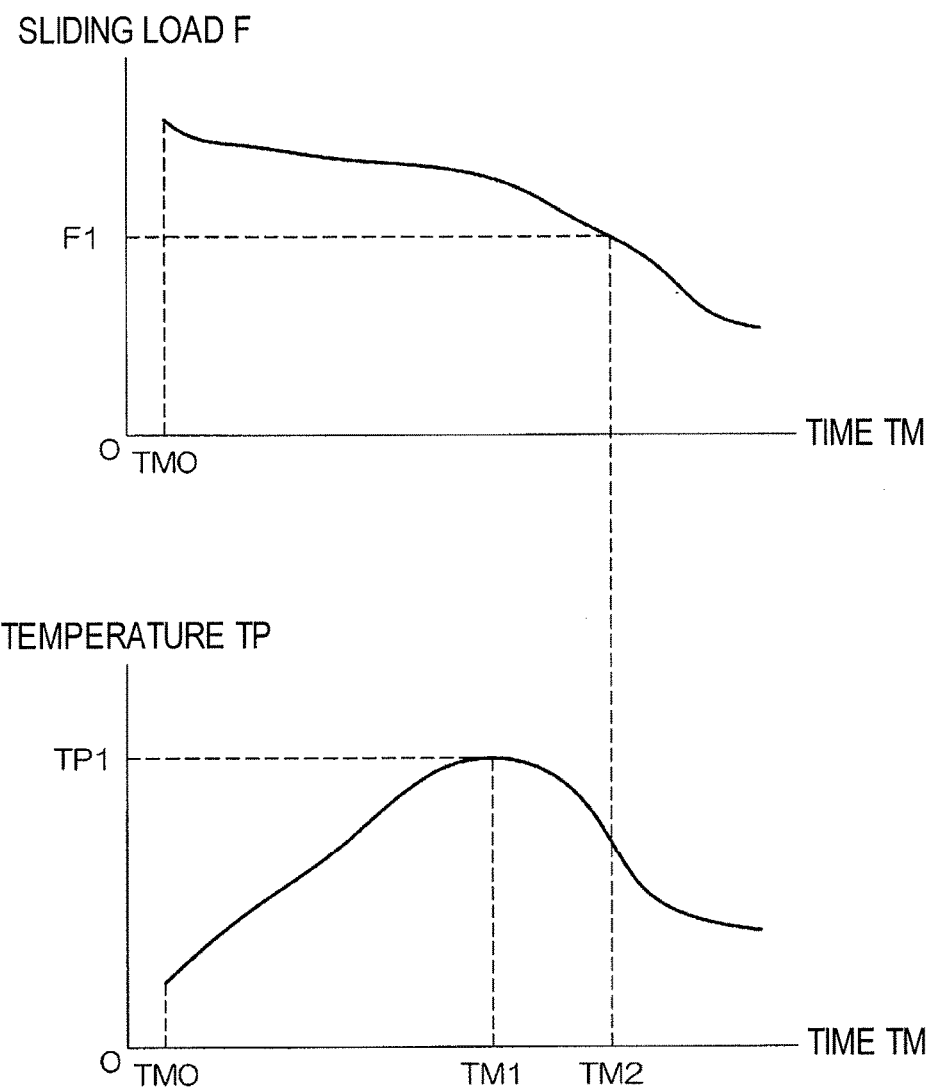
FIG. 8 shows a graph showing a relationship between sliding load and time in the heating adaptation step and a graph showing a relationship between the temperature of a resin coating of the shaft manufacturing intermediate product and time.

FIG. 8 shows a graph showing a relationship between sliding force F and time TM in the heating adaptation step and a graph showing a relationship between the temperature TP of the resin coating 139 of the internal shaft manufacturing intermediate product 147 and time TM. As shown in FIG. 8, in the heating adaptation step with the sliding apparatus 90 used, the shaft manufacturing intermediate products 46, 147 slide relatively in association with the start of driving the sliding apparatus 90 from time TM0. This increases the temperature TP of the resin coating 139 as time elapses until a predetermined time TM1. As this occurs, the surface of the resin coating 139 is made smooth while being heated as a result of sliding against the external shaft manufacturing intermediate product 46. This gradually decreases the sliding resistance, that is, the sliding load F.

When the sliding load F decreases, the sliding motion of the shaft manufacturing intermediate products 46, 147 becomes smooth, whereby the quantity of heat generated is decreased. Then, the temperature TP of the resin coating 139 decreases after it has increased to its highest temperature TP1 as the predetermined temperature at the predetermined time TM1. When the sliding load F lowers below a predetermined load F1 after the temperature TP of the resin coating 139 has exceeded its highest temperature TP1 (when time TM2 is reached), the surface of the resin coating 139 is made smooth sufficiently. The heating adaptation step is completed at this point in time.

Thus, as has been described heretofore, according to this embodiment, in the heating adaptation step, the shaft manufacturing intermediate products 46, 147 are held by the sliding apparatus 90 in such a way as to adjust the central axis lines thereof. Namely, the sliding apparatus 90 holds the shaft manufacturing intermediate products 46, 147 in such a way as to be displaced in directions other than the axial direction X1 so as to suppress the application of a force which attempts to change the state in which the central axis lines L1, L2 of the shaft manufacturing intermediate products 46, 147 are aligned with each other to the shaft manufacturing intermediate products 46, 147. By doing so, it is possible to suppress the application of the unintended force (for example, the radial force 91) as the force other than the thrust force to the shaft manufacturing intermediate products 46, 147.

By performing the heating adaptation step in this state, it is possible to bring (or to adapt) all surfaces of portions of the surface 139a of the resin coating 139 which are in contact with the mating external shaft manufacturing intermediate product 46 into sliding contact with (to) the surface of the external shaft manufacturing intermediate product 46. Moreover, in the heating adaptation step, the grease 48 is interposed between the shaft manufacturing intermediate products 46, 147. By doing so, in the heating adaptation step, it is possible to suppress the application of frictional resistance which is more than required to the surface of the resin coating 139.

Consequently, it is possible to suppress the occurrence of softening of the resin coating 139 by the frictional heat or the production of a roll of abrasion powder attributed to shear stress produced in the resin coating 139, thereby making it possible to suppress the roughening of the resin coating 139 by the abrasion powder. The surface 139a of the resin coating 139 can be finished extremely smoothly by the effect of holding the shaft manufacturing intermediate products 46, 147 in such a way as to adjust the central axis lines thereof, together with the effect of interposing the grease 48 therebetween.

On top of that, in the heating adaptation step, since the frictional heat produced in the resin coating 139 can be decreased, the shaft manufacturing intermediate products 46, 147 can rotate relatively at higher speeds while suppressing the production of a roll of abrasion powder. Since this can complete the heating adaptation step in a short period of time, it is possible to manufacture the intermediate shaft 5 more efficiently.

Further, since the shaft manufacturing intermediate products 46, 147 are mounted in the first and second holding mechanisms 91, 92, respectively, which have the central axis line adjusting function prior to the heating adaptation step, the shaft manufacturing intermediate products 46, 147 do not have to be positioned with good accuracy to be held. Consequently, the time spent mounting the shaft manufacturing intermediate products 46, 147 on the sliding apparatus 90 can be shortened, whereby the time necessary to finish the resin coating 139 can be shortened, thereby making it possible to manufacture the intermediate shaft 5 more efficiently.

In addition, in the heating adaptation step, the shaft manufacturing intermediate products 46, 147 are held via the universal joints 4, 6 in such a way as to adjust the central axis lines thereof. By doing so, in the heating adaptation step, when the shaft manufacturing intermediate products 46, 147 are caused to slide relatively, in the event that the force other than the thrust force acting along the axial direction X1 (the unintended force such as the radial force F1) attempts to act on the shaft manufacturing intermediate products 46, 147, the shaft manufacturing intermediate products 46, 147 are made to be inclined. By doing so, it is possible to suppress the application of the unintended force to the shaft manufacturing intermediate products 46, 147 in an ensured fashion.

In this way, in the heating adaptation step, it is possible to suppress the application of the unintended force to the shaft manufacturing intermediate products 46, 147 in the ensured fashion with the simple configuration in which only the two universal joints 4, 6 are used. In addition, in manufacturing the torque transmission shaft like the intermediate shaft 5 of the vehicle steering apparatus 1 which includes the universal joints 4, 6 which are provided at the one end portion of the internal shaft 35 and the one end portion of the external shaft 36, the shaft manufacturing intermediate products 46, 147 can be held in such a way as to adjust the central axis lines thereof by using the universal joints 4, 6. By doing so, in the heating adaptation step, the number of parts for use in holding the shaft manufacturing intermediate products 46, 147 in such a way as to adjust the central axis lines thereof can be reduced. Additionally, the equipment for use in holding the shaft manufacturing intermediate products 46, 147 in such a way as to adjust the central axis lines thereof can be made small in size.

Further, the heating adaptation step is completed when the sliding load F of the shaft manufacturing intermediate products 46, 147 lowers below the predetermined load F1 after the temperature TP of the shaft manufacturing intermediate products 46, 147 has exceeded the highest temperature TP1.

In the heating adaptation step, when the shaft manufacturing intermediate products 46, 147 start to slide relatively, firstly, the temperatures of the shaft manufacturing intermediate products 46, 147 are increased by the sliding friction between the shaft manufacturing intermediate products 46, 147. Then, by continuing the relative sliding operation, the surface of the resin coating 139 is adapted to the inner surface of the internal shaft manufacturing intermediate product 147. This decreases the sliding resistance between the shaft manufacturing intermediate products 46, 147. In addition, the temperature TP of the shaft manufacturing intermediate products 46, 147 also decreases in association with the decrease in sliding resistance between the shaft manufacturing intermediate products 46, 147. In this way, by causing the heating adaptation step to be completed when the sliding load F of the shaft manufacturing intermediate products 46, 147 lowers below the predetermined load F1 after the temperature TP of the shaft manufacturing intermediate products 46, 147 has exceeded the highest temperature TP1, the heating adaptation step can be completed at the appropriate timing.

In addition, in the heating adaptation step, the grease 48 is applied. By doing so, when the intermediate shaft 5 is in use, the sliding resistance between the shaft manufacturing intermediate products 46, 147 can be decreased by the grease 48 required. By decreasing the sliding resistance in that way, in the heating adaptation step, lubricant for decreasing the sliding resistance between the shaft manufacturing intermediate products 46, 147 does not have to be prepared separately, thereby making it possible to decrease the manufacturing costs of the intermediate shaft 5.

By adopting the configurations described heretofore, the circumferential looseness of the intermediate shaft 5 can be reduced, and the collapsing operation of the intermediate shaft 5 can be performed smoothly. The smooth collapsing operation can realize the vehicle steering apparatus 1 which has superior quietness and steering feel.

In addition, the shaft manufacturing intermediate products 46, 147 can easily be set in the sliding apparatus 90 with the simple operation of attaching the universal joint 4 to the first holding mechanism 91 and attaching the universal joint 6 to the second holding mechanism 92.

Additionally, by providing the groove 52 in the surface 139a of the resin coating 139, the abrasion powder described above can be taken into an interior of the groove 52. Consequently, since there is no such situation that abnormal wear is produced in the surface 139a of the resin coating 139 by the abrasion powder whose quantity would otherwise be increased largely, the surface 139a of the resin coating 139 is allowed to be fitted to the mating member in the relatively smooth conditions.

Consequently, an actual contact area between the spline surfaces 37a, 38a of the external splines 37 and the internal splines 38 can be increased, as a result of which it is possible to realize the intermediate shaft 5 which has a superior sliding performance and superior durability. In addition, since the groove 52 functions as a lubricant reservoir when the intermediate shaft 5 is in use, a good lubricating state can be maintained for a long period of time.

The invention is not limited to the contents of the embodiment that has been described heretofore and hence can be modified variously without departing from the scope of claims.

For example, in the embodiment, while the shaft manufacturing intermediate products 46, 147 are mounted in the sliding apparatus 90 via the universal joints 4, 6, the invention is not limited thereto. The shaft manufacturing intermediate products 46, 147 should be mounted in the sliding apparatus 90 so as to be displaced in the inclined fashion and in the direction which is at right angles to the axial direction X1. For example, a universal joint may be provided at an intermediate portion of the rod 94. In addition, in the heating adaptation step, a spherical joint or an Oldham coupling may be used in place of the universal joints 4, 6.

Additionally, in place of the first holding mechanism 91 of the sliding apparatus 90, the second holding mechanism 92 may be driven in the axial direction X1. Alternatively, both the first and second holding mechanisms 91, 92 may be driven in the axial direction X1.

In the embodiment described above, while the resin coating is described as being formed on the external splines of the internal shaft, the invention is not limited thereto. The resin coating may be formed on at least the spline surfaces of the internal splines of the external shaft. As this occurs, when forming a resin coating by cutting a resin layer formed on the internal splines of the external shaft manufacturing intermediate product, the heating adaptation step is applied to the resin layer by using the internal shaft manufacturing intermediate product.

Additionally, in the embodiment, while the intermediate shaft 5 of the steering apparatus 1 is described as constituting the torque transmission shaft, the invention may also be applied to torque transmission shafts of other apparatuses of the vehicle.

This patent application is based on Japanese Patent Application No. 2011-061470 filed on Mar. 18, 2011, the contents of which are incorporated therein by reference.

DESCRIPTION OF REFERENCE NUMERALS AND CHARACTERS

1: vehicle steering apparatus; 4: universal joint (first joint); 5: intermediate shaft (torque transmission shaft); 6: universal joint (second joint); 35 internal shaft; 36 external shaft; 37 external spline; 38: internal spline; 46: external shaft manufacturing intermediate product; 48: grease (lubricant); 139 resin coating; 139a: surface of resin coating; 147: internal shaft manufacturing intermediate product; F: sliding load; F1: predetermined load; L1: central axis line (of external shaft manufacturing intermediate product); L2: central axis line (of internal shaft manufacturing intermediate product); TP: temperature of shaft manufacturing intermediate product; TP1: highest temperature (predetermined temperature); X1: axial direction.

The invention claimed is:

1. A method of manufacturing a torque transmission shaft, the torque transmission shaft comprising:
   an internal shaft having an external spline provided on an outer circumference thereof;
   a tubular external shaft having on an inner circumference thereof an internal spline which is configured to slidably mesh with the external spline; and
   a resin coating provided on at least one of the external spline and the internal spline,
the method comprising:
   an adaptation step of adapting a surface of the resin coating by causing a shaft manufacturing intermediate product of the internal shaft and a shaft manufacturing intermediate product of the external shaft to slide relatively in an axial direction,
   wherein coaxial alignment of a central axis line of the shaft manufacturing intermediate product of the internal shaft and a central axis line of the shaft manufacturing intermediate product of the external shaft is maintained throughout the adaptation step by mounting the shaft manufacturing intermediate products, during the adaptation step, on first and second joints of a sliding apparatus that are attached to one end portion of the shaft manufacturing intermediate product of the external shaft and one end portion of the shaft manufacturing intermediate product of the internal shaft, respectively, the first and second joints being configured to permit a change in inclination of the shaft manufacturing intermediate products in response to a load for relative sliding imparted to the shaft manufacturing intermediate products via the first and second joints during the adaptation step.

2. The method according to claim 1, wherein the first and second joints are universal joints each including a cruciform coupling first and second parts.

3. The method according to claim 1, wherein the adaptation step is completed after a temperature of the shaft manufacturing intermediate products exceeds a predetermined temperature and when a sliding load of the shaft manufacturing intermediate products lowers below a predetermined load.

4. The method according to claim 1, wherein
each of the first and second joints includes:
   a first part fixed to one end portion of the corresponding shaft manufacturing intermediate product; and
   a second part coupled with the first part so as to be allowed to oscillate relative to the first part around an axis line orthogonal to the central axis line of the corresponding shaft manufacturing intermediate product, and
the second parts of the first and second joints are respectively held by first and second holding mechanisms which are allowed to reciprocate rectilinearly in a direction in which the first and second holding mechanisms face each other, the second parts being integrally movable with first and second holding mechanisms.

5. The method according to claim 1, wherein the adaptation step is completed after a temperature of the shaft manufacturing intermediate products reaches a peak temperature and when a sliding load of the shaft manufacturing intermediate products lowers below a predetermined load.

6. The method according to claim 1, wherein, in the adaptation step, a lubricant is interposed between the shaft manufacturing intermediate products.

7. The method according to claim 6, wherein the lubricant comprises a grease or a base oil for the grease.

8. A method of manufacturing a torque transmission shaft, the torque transmission shaft comprising:
   an internal shaft having an external spline provided on an outer circumference thereof;
   a tubular external shaft having on an inner circumference thereof an internal spline which is configured to slidably mesh with the external spline; and
   a resin coating provided on at least one of the external spline and the internal spline,
the method comprising:
   an adaptation step of adapting a surface of the resin coating by causing a shaft manufacturing intermediate product of the internal shaft and a shaft manufacturing intermediate product of the external shaft to slide relatively in an axial direction in such a state that a central axis line of the shaft manufacturing intermediate product of the internal shaft and a central axis line of the shaft manufacturing intermediate product of the external shaft are coaxially aligned with each other; and
   applying a lubricant, which is different from the resin coating, before the adaptation step, so that the applied lubricant is interposed between the shaft manufacturing intermediate products during the adaptation step,
   wherein the adaptation step is controlled to stop in response to (i) a decrease in a temperature of the resin coating after the resin coating reaches a peak temperature, and (ii) a decrease in a sliding load of the shaft manufacturing intermediate products to a predetermined load.

9. The method according to claim 8, further comprising, after the adaptation step:
   additionally applying the lubricant between the internal shaft and the external shaft, thereby completing the torque transmission shaft.

* * * * *